Figure 5:
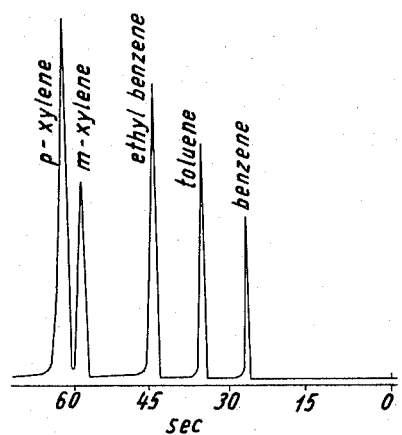

col. lenght: 30 m (copper)
i.d. : 0.25 mm
stat. phase : 7.8 benzoquinoline
temperature : 80°C
flame ionisation detector

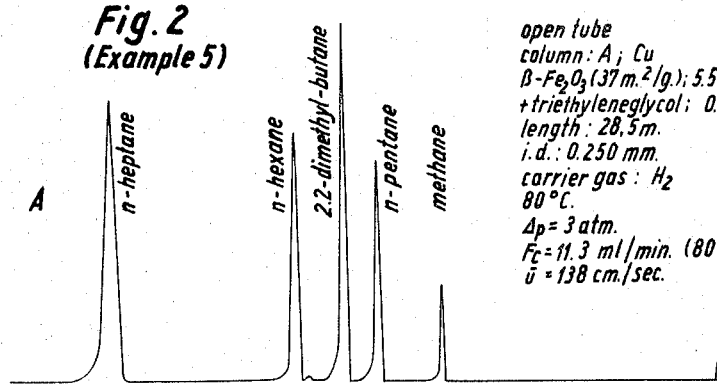
Fig. 2 (Example 5)
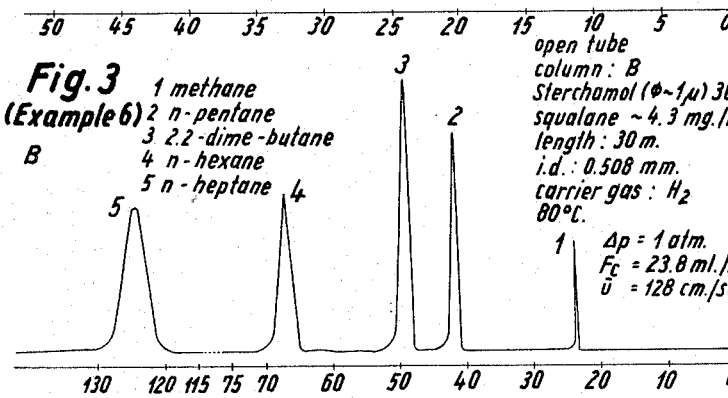
Fig. 3 (Example 6)
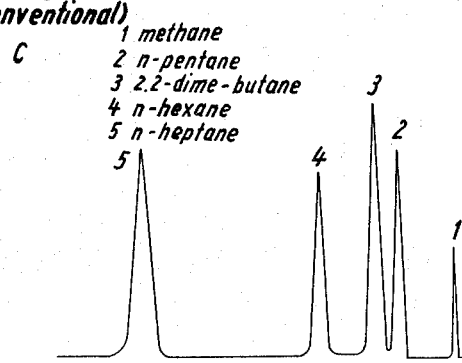
Fig. 4 (Conventional)

United States Patent Office 3,295,296
Patented Jan. 3, 1967

3,295,296
SEPARATING COLUMNS FOR GAS
CHROMATOGRAPHY
Istvan Halasz and Csaba Horvath, Frankfurt am Main,
Germany, assignors to The Perkin Elmer Corporation, Norwalk, Conn.
Filed Oct. 21, 1963, Ser. No. 317,714
Claims priority, application Germany, Oct. 23, 1962,
H 47,198
17 Claims. (Cl. 55—67)

This invention relates to the manufacture of separating columns for gas chromatography, and is especially concerned with capillary columns having small inner diameters, such as up to 1 mm. and preferably of 0.25 to 0.5 mm., both for gas-solid and for gas-liquid chromatography.

The separating column manufactured according to the invention in either case consists essentially of a tube with a thin porous layer adhering to its inner wall. For gas-solids chromatography this porous layer is dry and represents the active medium itself, whilst for gas-liquid chromatography the porous layer preferably is inactive per se and serves as a means for fixing a thin film of an active (absorptive) separating liquid to the inner surface of the capillary tube, and last but not least the active porous layer may be coated with a separating or partitioning liquid (gas adsorption layer chromatography= GAC).

A gas chromatographic separating column consisting of a tube, the inside of which carries the separating medium in the form of a film, is described in literature. It is advantageous to increase the surface of the inner tube wall before the manufacture of such columns; for which purpose it is known to insert a helical wire into the tube or to provide a porous layer on its inner wall.

Although it might be expected that gas chromatographic separating columns with a solid porous layer adhering to the inner surface of the tube would offer important advantages, practically no advantageous result achieved with such columns in practice has become known. Evidently a general process by which columns with these desired properties could be produced in a not too complicated and practically realizable way was not known or appreciated. Indeed, a process for the production of separating columns has been described in which a solid substance in the form of a fine powder was suspended in a dispersive liquid to form a slurry, and the inner surface of a tube was smeared with this slurry. Thereby the solid substance served as a carrier for the stationary phase (i.e. for the separating liquid) or it formed part of it. By subsequent heating of the tube the dispersing fluid was evaporated, so that the particles of the solid substance remained on the inner surface of the tube and were fixed there, e.g. by burning them in. But nothing else has been published in the literature about good results achieved with columns prepared in this way, so that it must be assumed that this process also did not answer requirements satisfactorily.

The instant invention also is concerned with a process of manufacturing a gas chromatographic separating column from a tube the inner wall of which carries the stationary phase in the form of a thin porous layer, which may be either inactive and impregnated with a partitioning or separating liquid or which may be active in itself, in which later case it can be coated or uncoated with a separating liquid, preferably a polar one. Thereby a dispersion of a finely divided solid substance, which might be mixed with a separating liquid, is dispersed in a low boiling liquid. This dispersion is filled into the capillary tube. After the evaporation of the low boiling liquid the stationary phase adheres on the inner wall of the tube in the form of a thin porous layer. The invention comprises filling the tube completely and free from bubbles with the stable suspension which contains all of the components of the stationary phase to be formed, closing the filled tube at one end, and causing the dispersion liquid to evaporate by a controlled heating of the tube, starting the heating at its open end and progressing with the heating along the length of the tube. The solid particles of the suspension thereby remain on the inner surface of the tube wall in the form of a uniform coherent-adherent layer which may eventually also contain a separating liquid. Advantageously, the part of the tube from which the dipersion liquid has already been evaporated is kept at a temperature above the dew point.

It has been surprisingly found that, contrary to the mentioned known processes, the inventive method of completely filling the tube with a suspension already containing solid particles, closing it at one end, and causing the dispersion liquid to evaporate by a progressive heating of the tube, beginning at its open end, does give gas chromatographic columns actually answering all requirements. The thin porous layer produced in this way adheres reliably to the inner surface of the tube without any aftertreatment.

The inventive process is applicable not only to the application of active layers, consisting of a solid adsorbent, in one step onto the inner surface of a column tube, but also for the production of layers consisting of a combination of a powdered solid substance active or inactive wetted with an absorptive separating liquid. Contrary to the known processes of applying a slurry in the form of a paste onto the inner surface of the tube, the instant process permits the manufacture of separating columns of an appreciable length, e.g. 10 to 80 meters, whereby the thickness as well as the composition of the layer to be formed can be nicely adjusted to meet changing requirements.

Separating columns manufactured according to the invention show a markedly increased separation efficiency as compared to that of known columns. Apart from the increased separation efficiency, the inventive process brings other advantages which will be explained in connection with the corresponding process steps.

The present process for the manufacture of separating columns is preferably performed in three major steps. The first step consists in the preparation of a suspension of all of the components which are desired in the porous layer by dispersing them in an inert dispersive liquid. As a second major step, the suspension is pressed into the prepared capillary tube in such a way that the tube is filled free from bubbles. The filling can be performed under application of increased pressure, usually 150 to 200 kg./cm.$^2$. After the filling, one end of the capillary tube is closed. Hereupon the filled capillary tube is inserted with its open end into, and drawn through, a heated tube furnace and preferably wound up onto a spool. Such spool is placed in a room, the temperature of which is kept constant by means of a thermostat. The temperature of this room should be kept lower than that of the tube furnace, but higher than the dew point, which is practically identical with the boiling point of the low boiling liquid. During the heating the dispersing liquid evaporates and escapes through the open end of the capillary.

The solid substance, or the solid substance impregnated with the high boiling separating liquid, remains on the wall of the tube in the form of a coherent layer. After the whole length of the tube has been drawn through the kiln, the closed end is opened and a "weak" (i.e. low pressure) gas stream is blown through the capillary from its originally open end, eventually under increased temperature.

In this way a thin porous layer capillary with reproducible properties can be produced. By proper choice of grain size (usually, below 1 micron) and suitable dispersing liquids the particles can be caused to adhere sufficiently together and to the wall, so that they cannot move into the gas space or to the detector during use and thereby cause clogging. On the other hand, it can also be accomplished that the layer does not become too dense, so that the porosity necessary for a rapid mass transfer is provided and maintained.

The dispersive liquid should have a relatively low boiling point, so that the temperature of the kiln can be kept low during the evaporation. Although the use of a low boiling dispersive liquid has been suggested in connection with the manufacture of dry columns (for solid-gas-chromatography), this consideration is of special importance for the manufacture of columns with a porous layer impregnated with a separating liquid. In this latter case the difference between the boiling point of the dispersive liquid and that of the active separating liquid should be as high as possible, i.e. the boiling point of the dispersive liquid as low as possible, not only to avoid a possibly unfavourable reaction of the separating liquid with either the dispersive liquid or the solid but also to avoid entrainment of vapors of the separating liquid by the escaping vapors of the dispersive liquid.

In order to provide stable suspensions, dispersive liquids of high density and high viscosity should be used. As the primary demand of a low boiling point cannot be neglected, liquids with the highest viscosities cannot be used, as these also have high boiling points, but $C_2Cl_3F_3$, $CCl_4$, $CH_2Cl_2$ and $CH_2Br_2$ give good combinations of high viscosity and density with low boiling point. For these reasons $C_2Cl_3F_3$ is the preferred dispersive liquid in view of its high density—1.58 g./cm.$^3$—and low boiling point ($+47.5°$ C.).

The stability of the suspension is important, because sedimentation of the solids endangers the uniform application of the layer. If, with a given solid, insufficient stability can be achieved by proper choice of dispersive liquid, concentration and particle size alone, the viscosity—and thereby the stability—can be increased by the addition of a thickening agent having no detrimental effect on the quality of the capillary column produced. As an example of such a thickener the highly dispersed silicon dioxide produced pyrolytically and sold under the trademark "Aerosil" can be named which, added in an amount of 1 to 3%, dissolved in a polar solvent such as $CCl_4$, prevents the settling of coarse particles. For the thickening of aqueous suspensions a product sold by the same company (Degussa) under the name "COK 84," consisting of 84% "Aerosil" and 16% highly dispersed $Al_2O_3$ has been used with good success in amounts of 0.5 to 1.5%.

The manufacture of porous layers consisting of a solid and an additional liquid film in the capillary tube can be achieved according to further embodiments of the invention in two different ways.

(a) If the separating liquid is insoluble in the dispersive liquid of the suspension, the solid carrier substance with the desired particle size is impregnated with a solution of the separating liquid in a suitable solvent, such as $CH_2Cl_2$, in a known manner; the solvent is then evaporated, and the so-obtained impregnated powder suspended in the dispersive liquid.

(b) If the separating liquid is soluble in the dispersive liquid of the suspension, it is sufficient to dissolve the desired amount of separating liquid in the dispersive liquid, either before preparing the suspension or in the finished suspension itself. Upon application of the layer on the wall of the capillary tube a thin film of the separating liquid remains on the surface of the particles.

Suspension of the solid particles in the liquid can be achieved by means of a rapid mixer or a colloid mill. Usually, a treatment of a few minutes is sufficient if no additional comminution of the solid is desired. Before pressing the suspension into the capillary it is advantageous to pass it through a pressure sieve in order to eliminate coarser agglomerates, which latter could lead to cloggings in the capillary.

As solids every powdery substance useable as adsorption agents or as a carrier can be used, e.g. carbon black, carbon black in graphitized form, fire brick, kieselguhr, silica gel, metal oxides, cellulose, synthetic plastics, ion exchange resins, etc., can be used. The solid adsorption agent can be chemically active. Its activity can be caused by a disturbed crystal lattice or even by the smallness of the particles themselves.

As separating liquid the liquids conveniently used in gas chromatography are useable, such as squalene, dinonyl phthalate, polyglycols, etc. In selecting a combination of a dispersive liquid and a separating liquid it is to be borne in mind that the separating liquid shall neither dissociate nor unfavourably react with either the solid or the dispersive liquid at the temperature necessary for evaporating the latter.

Filling the capillary is advantageously done by means of a pressure vessel and an inert gas such as nitrogen, helium, argon, etc. The pressure to be used depends on the diameter and the length of the capillary and on the viscosity of the suspension: it is usually between 2 and 200 kg./cm.$^2$. The capillary tube should be cleansed from impurities (i.e., "prepared") by washing with solvents such as methanol, methylene chloride, petroleum ether, $CCl_4$, etc., prior to filling.

The temperature of the air thermostat arranged behind the evaporation kiln should be kept so high as to exclude any possibility of condensation of the escaping vapors of the dispersive liquid on cooler walls of the capillary. The velocity of these escaping vapors can be appreciably high, such as 15 meters/min. and more. Such high velocities aid in leveling the layer produced. In a further arrangement, evaporation of the dispersive liquid can advantageously be effected under reduced pressure. After application of the layer and evaporation of the dispersive liquid, a gas stream, e.g. nitrogen or hydrogen, is passed through the capillary in order to eliminate traces of the dispersive liquid. Such passing of a cleaning gas through the capillary is done advantageously at the highest temperature permissible for the stationary phase or at least at the highest temperature at which the column is to be operated.

On the one hand, the separating columns manufactured according to the invention are comparable to the so-called capillary columns because of the very similar flow properties characteristic for an open tube, and on the other hand they are in many respects similar to packed columns due to the high capacity of the stationary phase. Moreover, the inventive technique permits the use of such solids as a stationary phase in a capillary as could not be used heretofore for gas chromatography. Thereby, new ways of analysis technique are opened.

It is also possible more or less to shift the properties of the columns to those of packed or of capillary columns. Shifting to the properties of a packed column can be effected, e.g., by increasing the thickness of the applied layer. Whereas usually layers with a thickness of 10 to 100 microns, mostly of about 20–60 microns are applied, and this layer thickness is selected in accordance with the inner diameter of the capillary used, so that there remains a sufficiently large free passage along the axis of the tube—i.e. layer thicknesses of the order of 100 microns are usually applied only in tubes with a substantially larger inner diameter than 0.2 mm.—it is possible practically completely to fill the inner space of the capillary with the applied layer. The increase in layer thickness can be achieved, e.g., by using suspensions of a high solids content. A shifting to the properties of packed columns can also be achieved by a deliberate unequal application of the layer or by crumbling off parts of the porous layer. In these latter cases the "open tube" character of the column disappears more or less, to be replaced by the characteristics of a packed column.

Such columns can give special advantageous results in special cases, e.g. for components such as low-boiling hydrocarbons which are withheld less by the stationary phase in a capillary column. Another way to achieve the characteristics of a packed column in a reproducible way is to draw the column, after the layer has been applied on its inner wall, between two rollers. Also, an elliptical deformation of the cross section by means of two rollers with unequal gearing can be advantageous. For a given thickness of the layer the capacity proportion of the column is changed hereby. This last-mentioned method is important especially if the capillary column has a relatively large inner diameter, such as 0.5 to 1.0 mm., and a separating problem is to be solved by means of a short column.

A further embodiment of the invention consists in the application of a special coating onto the inner surface of the tube prior to filling with the suspension. Especially if the tube material is copper, it is advantageous to avoid the disturbing influence of the copper surface by coating it with any smooth surface coating, such as varnish, lacquer or a coating of another, smoother, metal, e.g. silver. If on the other hand, the tube material is glass or a similar substance with an extremely smooth surface, it is advantageous to etch the inner surface of the tube prior to filling it, in order to roughen it and thereby to increase the adherence of the applied layer.

A preferred embodiment for the manufacture of columns with small cross-section consists in filling a tube with the suspension, closing it on one end and decreasing its cross-section by drawing it to a greater length simultaneously with heating it for evaporation of the dispersive liquid. Thereby the porous layer is applied in the same operational step in which the column is given its definitive shape.

Columns manufactured according to the invention can also be used for examining the surface properties of any substance, introduced into the capillary, according to known gas chromatographic methods. In this way adsorption isotherms, heats of adsorption, specific surfaces, etc. can be determined.

The invention is explained in a non-limitative way in the following examples, all parts mentioned in the examples being parts by weight.

*Example 1*

15 m. of a metallic capillary tube with an inner diameter of 0.25 mm. are rinsed with 10 cm.$^3$ of $CH_2Cl_2$ and $CCl_4$ each and filled with $CCl_4$. 6 parts of graphitized carbon black with a specific surface of 78 m.$^2$/g. are suspended in 94 parts of $C_2Cl_3F_3$, under cooling, by means of a rapid mixer at 8000 r.p.m. The suspension obtained is pressed through a sieve with sieve openings of 0.06 mm., and the suspension is then pressed into the capillary tube at a pressure of 180 kg./cm.$^2$ gauge. After the tube has been filled, one end of it is closed by pressing it shut. The capillary tube is then progressed at a rate of 1 m./hr. through a kiln, beginning at its open end, and wound upon a spool within an air thermostat. The temperature within the kiln is 250° C., and in the air thermostat is 100° C. After the whole length of the capillary has been wound up, the application of the layer material is finished. Hereupon the closed end is cut open and a stream of nitrogen is passed through the column at a rate of about 50 to 100 m./min. and at a temperature of 100° C. for 24 hours.

The column produced in this way contains about 0.05 g. graphitized carbon black.

*Example 2*

7 parts of finely ground gamma $Al_2O_3$ (particle size about 1μ) are mixed thoroughly with a suspension of 3 parts carbon black and 30 parts $CH_2Cl_2$: the mixture is dried and finely subdivided.

The product obtained is stirred into 90 parts of distilled water by means of a rapid mixer (10,000 r.p.m.). The suspension obtained is then pressed into a copper capillary with an inner diameter of 0.5 mm., the inner surface of which has been freshly coated with silver and thoroughly rinsed with water. After the capillary has been filled with the suspension, it is closed on one end and is passed through the kiln at a rate of 2 cm./min. in the manner described in Example 1. The kiln temperature is 300° C. and the air thermostat temperature is 150° C.

Through the separating column thus obtained a stream of nitrogen was passed for 6 hours at 150° C.

*Example 3*

By thorough mixing a suspension is formed consisting of 22 parts kieselguhr, 2 parts highly dispersed silicon dioxide "Aerosil," 6 parts dinonyl phthalate and 210 parts $CCl_4$.

A copper capillary (length about 20 m.: inner diameter 0.5 mm.) is cleaned, filled with the suspension at 100 kg./cm.$^2$ g. and progressed at a rate of 4 cm./min. in the described way at 180° C. kiln temperature and 120° C. air thermostat temperature. After the closed end is opened the column is rinsed for 24 hours with hydrogen at 120° C.

*Example 4*

15 parts of "Molecular Sieve 5A" (trademark of Linde) are ground up, suspended in 85 parts $CCl_4$ and a copper capillary is filled with this suspension and treated further in the described way.

*Example 5*

20 parts fire brick, ground up to a fineness of about 1 mm., is washed with acid, "sterchamol" alkali-treated and dried azeotropically with xylene. 22 parts of a solution of 10% squalene in petroleum ether and 0.05 part Alkaterge T (trademark of commercial Solvent Company) in 10 parts $CH_2Cl_2$ is thoroughly mixed with the fire brick and the mixture is then dried. The product is subsequently subdivided and is suspended in a mixture of $CH_2Br_2$ nad $CCl_4$ by means of a rapid mixer.

The suspension is used in the described way to produce a coated capillary column for gas chromatography.

*Example 6*

22.15 parts of a highly dispersed iron oxide (specific surface=37 m.$^2$/g.) are mixed thoroughly with a solution of 1.25 parts triethylene glycol in 20 parts $CH_2Cl_2$, and the mixture is heated for 12 hours at 110° C. in a drying oven.

The iron oxide impregnated with triethylene glycol, so obtained, is stirred (under cooling) into a mixture of 57.54 parts $CCl_4$ and 124.76 parts $C_2F_3Cl_3$ and the suspension is passed over a sieve.

The sieved suspension is used in the described way to fill and coat capillary columns.

*Example 7*

A suspension is made of 9 parts highly dispersed $TiO_2$ (spec. surf.=50 m.$^2$/g.) in 70 parts of a mixture of petroleum ether and isopropylalcohol, and 1 part of squalene is added.

A nylon capillary tube is coated on the inner and outer surface with a polyurethane lacquer, produced according to the diisocyanate polyaddition process: the so-coated tube is then filled and coated with the suspension in the manner described in Example 1.

Figure 1:
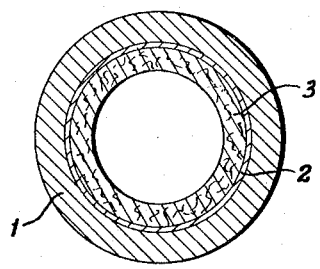

Illustrative of the capillary tube product, FIGURE 1 of the appended drawing represents a cross-section through a copper capillary tube treated in accordance with the present invention. In the drawing, the copper tubing is represented at 1. A silver coating over its inner surface is indicated at 2. At 3 is represented an active adsorptive layer consisting of the solid residue from a suspension of finely subdivided $Al_2O_3$ and carbon black in methylene chloride (per Example 2 above). The important improvement achieved by the invention is demonstrated by FIGURES 2 to 6, FIGURE 2 pertaining to gas adsorption layer chromatography (GAC), FIGURES 3, 4 and 6 pertaining to gas liquid chromatography (GLC) and FIGURE 5 to gas solid chromatography (GSC). FIGURE 2 is a chromatogram obtained with a column produced according to Example 6, FIGURE 3 is a chromatogram obtained with a column produced according to Example 5 and FIGURE 4 is a chromatogram obtained with a conventional column produced according to one of the most modern principles as described in published German patent application DAS 1,063,409 (Golay). In all three cases the same test mixture consisting of (1) methane, (2) n-pentane, (3) 2,2-dimethyl butane, (4) n-hexane and (5) n-heptane was used, as well as the same temperature (80° C.), carrier gas (hydrogen) and comparable linear flow rates. The stationary liquid phase was squalene for FIGURES 3 and 4. For FIGURE 2 a combination of an active solid ($Fe_2O_3$) with a separating liquid (triethyleneglycol) was used.

The evaluation of the quality of these 3 columns, measured in the standard way as described by Purnell et al. in "Gas Chromatography 1960" R. P. W. Scott, ed., p. 184, Butterworths, London, 1960, in terms of time necessary for analysis gives the following results:

|  | $t_{1,5}$ (calcd.) $(2,2C_4$–$C_5)$ sec. |
|---|---|
| Column Example 5, FIGURE 2 | 6.25 |
| Column Example 6, FIGURE 3 | 10.9 |
| Conventional capillary column, FIGURE 4 | 29.0 |

It can be seen that the time necessary for performing the standard analysis is reduced to about ⅓ to ¼ of the time necessary for the best conventional columns. Moreover, the capacity of the inventive columns is 1 to 2 powers of 10 higher than that of conventional columns. This gives the additional advantage that the heretofore necessary highly sensitive and costly amplifying detector systems can be dispensed with.

The inventive capillary columns also give surprisingly good results in pure gas solid chromatography. For example the separation of m- and p-xylene has presented considerable difficulties up to now to the analyst.

FIGURE 5 is a chromatogram obtained with the analysis of a mixture of aromatic hydrocarbons with a capillary column produced according to the invention. The column length was 15 m., its inner diameter 0.25 mm. with an active layer of 5.4 mg./m. graphitized carbon black.

It will be seen that the separation of m-xylene and p-xylene was completed in about 70 seconds with very sharp peaks.

Figure 6:
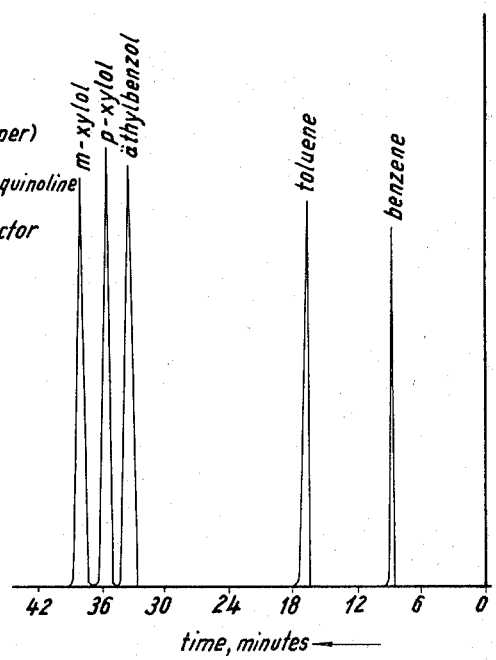

As heretofore no method at all was known to separate m- and p-xylene by gas solid chromatography, FIGURE 6 shows for comparison a chromatogram obtained with a conventional capillary column for gas liquid chromatography, this being at present the only known way to achieve a separation of m- and p-xylene by chromatographic measures.

The stationary phase was 7,8-benzoquinoline. The column used in this case had the same inner diameter of 0.25 mm. but double the length (30 m.) of that of the column used for FIGURE 5.

It will be seen that the time necessary to obtain separation of p- and m-xylene was 40 minutes for the conventional column as compared with 70 seconds for the inventive column.

We claim:

1. A process for fabricating an elution chromatography separating column from an elongated capillary tube, said tube having a layer of solid material disposed on an inner surface thereof, comprising the steps of:
    filling an elongated capillary tube with a stable suspension, including a dispersive liquid and particles of the solid material,
    closing the tube at an end thereof, and
    evaporating the dispersive liquid from the tube by progressively heating the tube beginning at an open end thereof, thereby forming a solid porous layer on the inner surface of the tube.

2. Process according to claim 1 in which the suspension includes a finely divided solid adsorbent in a liquid having dispersive properties.

3. Process according to claim 1, in which the suspension contains at least one high boiling liquid which wets the solid particles after drying of the suspension.

4. Process according to claim 3, in which the solid particles are impregnated with the high boiling liquid prior to suspending them in the dispersive liquid.

5. Process according to claim 3, in which the high boiling liquid is dissolved in the dispersive liquid.

6. The process according to claim 3, in which the solid particles include an active solid adsorption agent as the solid phase of the suspension.

7. Process according to claim 3, in which inactive solid particles are included in the solid phase of the suspension.

8. Process according to claim 1, in which the suspension includes a thickening agent.

9. Process according to claim 1, in which the evaporation of the dispersing liquid is done under reduced pressure.

10. Process according to claim 1, in which the inner surface of the tube is coated with a varnish or a metal, prior to being filled with the suspension.

11. Process according to claim 1, in which the filling of the tube is done under elevated pressure.

12. Process according to claim 1, in which the tube, after being filled with suspension, is deformed to an elliptical cross-section.

13. Process according to claim 1, in which the filled tube, after having been closed at or ⸗ end, is drawn to a greater length simultaneously with the evaporation of the dispersing liquid.

14. The process of claim 1 including the step of maintaining a portion of the tube from which the dispersive liquid has been evaporated at a temperature above the dew point of the dispersive liquid.

15. The process of claim 1 wherein said tube is progressively heated at a temperature and at a rate for causing relatively rapid evaporation of the dispersive liquid.

16. The process of claim 1, in which the suspension includes all of the components of the stationary phase.

17. A process for fabricating an elution chromatography separating column from an elongated capillary tube, said tube having a porous layer of solid state material disposed on an inner surface thereof, comprising the steps of:
    filling an elongated capillary tube with a stable suspension free of bubbles, said suspension including a dispersive liquid and particles of the solid material,
    closing the tube at an end thereof,
    evaporating the dispersive liquid from the tube by progressively heating the tube beginning at an open end thereof, and at a rate for causing rapid evaporation of the dispersive liquid, thereby forming a thin solid porous layer on the inner surface of the tube, and
    maintaining the portion of the tube from which the dispersive liquid has been evaporated at a temperature above the dew point of the dispersive liquid.

References Cited by the Examiner

UNITED STATES PATENTS

| 2,845,136 | 7/1958 | Robinson | 73—23.1 |
| 2,920,478 | 1/1960 | Golay | 73—23.1 |
| 3,005,514 | 10/1961 | Cole et al. | 55—386 |
| 3,169,390 | 2/1965 | Roper | 55—67 |
| 3,182,394 | 5/1965 | Jentzsch | 55—386 |

REUBEN FRIEDMAN, *Primary Examiner.*

C. N. HART, *Assistant Examiner.*